(12) United States Patent
Kawasaki et al.

(10) Patent No.: US 9,658,804 B2
(45) Date of Patent: May 23, 2017

(54) ELECTRONIC DEVICE THAT DISPLAYS DEGREE-OF-RECOMMENDATION, IMAGE FORMING SYSTEM, AND RECORDING MEDIUM

(71) Applicant: KYOCERA Document Solutions Inc., Osaka (JP)

(72) Inventors: Tomohiro Kawasaki, Osaka (JP); Yoshitaka Matsuki, Osaka (JP); Kunihiko Shimamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/135,744

(22) Filed: Apr. 22, 2016

(65) Prior Publication Data

US 2016/0313952 A1    Oct. 27, 2016

(30) Foreign Application Priority Data

Apr. 25, 2015 (JP) ................................. 2015-089900

(51) Int. Cl.
*G06F 15/00* (2006.01)
*G06F 3/12* (2006.01)

(52) U.S. Cl.
CPC .......... *G06F 3/1219* (2013.01); *G06F 3/1229* (2013.01); *G06F 3/1235* (2013.01); *G06F 3/1285* (2013.01)

(58) Field of Classification Search
None
See application file for complete search history.

(56) References Cited

U.S. PATENT DOCUMENTS

2005/0068557 A1* 3/2005 Patton ................ H04N 1/00477
358/1.13
2010/0074633 A1* 3/2010 Kuwasaki .......... H04N 1/00222
399/8

(Continued)

FOREIGN PATENT DOCUMENTS

| JP | 2012-029164 A | 2/2012 |
| JP | 2013-161246 A | 8/2013 |
| JP | 2014-093036 A | 5/2014 |

*Primary Examiner* — John Wallace
(74) *Attorney, Agent, or Firm* — IP Business Solutions, LLC

(57) ABSTRACT

An electronic device includes: a display device; a toner color determining section configured to determine, from print data, one or more use toner colors as the colors of toners for use during printing based on the print data; a degree-of-recommendation determining section configured to determine a degree of recommendation of the image forming apparatus according to a probability of a situation preventing printing on the image forming apparatus; and a degree-of-recommendation display section configured to allow the display device to display the degree of recommendation determined by the degree-of-recommendation determining section, wherein the degree-of-recommendation determining section is configured to acquire apparatus information about the image forming apparatus from a server on a network and determine the probability according to whether information, included in the apparatus information, on the toners of the use toner colors determined by the toner color determining section meets a specified criterion.

3 Claims, 13 Drawing Sheets

(56) References Cited

U.S. PATENT DOCUMENTS

| | | | |
|---|---|---|---|
| 2011/0058232 A1* | 3/2011 | Matsuoka | H04N 1/00002 358/474 |
| 2011/0141517 A1* | 6/2011 | Yokoyama | G06F 3/1203 358/1.15 |
| 2011/0299120 A1* | 12/2011 | Sekine | G06F 3/1221 358/1.15 |
| 2012/0019858 A1 | 1/2012 | Sato | |
| 2014/0063542 A1* | 3/2014 | Aoki | G06F 3/1296 358/1.15 |
| 2014/0126018 A1 | 5/2014 | Sugimoto | |

* cited by examiner

Fig.4

44B APPARATUS INFORMATION

| |
|---|
| APPARATUS SPECIFICATION INFORMATION<br>    NAME : XXXX<br>    COLOR/B&W : COLOR<br>    LINEAR SPEED : (COLOR) 26 ppm / (B&W) 26 ppm |
| MAINTENANCE IMPLEMENTATION INFORMATION :<br>(NUMBER OF IMPLEMENTATION TIMES IN LAST 5 DAYS / LAST IMPLEMENTATION TIME)<br>[FORCED TONER SUPPLY]<br>    C : 30 TIMES / 1 HOUR AGO<br>    M : ZERO / 20 DAYS AGO<br>    Y : ZERO / 15 DAYS AGO<br>    K : ONCE / 3 DAYS AGO<br>[CALIBRATION]<br>    83 TIMES / 4 HOURS AGO |
| APPARATUS STATUS INFORMATION<br>    FIXATION TEMPERATURE : 20°C |
| MEMBER EXCHANGE INFORMATION :<br>NUMBER OF TIMES / LAST EXCHANGE TIME<br>[TONER CARTRIDGES]<br>    C : -<br>    M : ONCE / 2014. 7.11 (10:00)<br>    Y : 3 TIMES / 2014. 9.15 (15:00)<br>    K : 20 TIMES / 2014. 8.30 (9:00)<br>[FIXATION DEVICES]<br>    C : ONCE / 2014. 9.20 (11:00)<br>    M : -<br>    Y : -<br>    K : 2 TIMES / 2014. 8.30 (8:30) |
| TONER LEVEL INFORMATION<br>    C : 2%<br>    M : 66%<br>    Y : 55%<br>    K : 69% |
| WASTE TONER BOTTLE USAGE INFORMATION : 10% |

57B CRITERION TABLE

| APPLICABILITY | DETERMINATION ITEMS | CRITERIA |
|---|---|---|
| ON | FORCED TONER SUPPLY | TONER LEVEL 3% OR BELOW OVER 10 TIMES IN LAST 5 DAYS |
| OFF | CALIBRATION | OVER 10 TIMES IN LAST 5 DAYS LAPSE OF 1 OR MORE DAYS FROM LAST IMPLEMENTATION TIME |
| ON | WARM-UP | FIXATION TEMPERATURE BELOW 30°C |
| ⋮ | ⋮ | ⋮ |

ELECTRONIC DEVICE THAT DISPLAYS DEGREE-OF-RECOMMENDATION, IMAGE FORMING SYSTEM, AND RECORDING MEDIUM

INCORPORATION BY REFERENCE

This application claims priority to Japanese Patent Application No. 2015-089900 filed on Apr. 25, 2015, the entire contents of which are incorporated by reference herein.

BACKGROUND

The present disclosure relates to an electronic device, an image forming system, and a non-transitory computer-readable recording medium, and particularly relates to a technique for causing a user know an image forming apparatus in which a situation preventing the implementation of printing is less likely to arise.

A typical image forming system is known that can display a shot image of an image forming apparatus with which information about the image forming apparatus is synthesized at a position corresponding to the image forming apparatus. However, this typical image forming system has a problem in that if a situation preventing the implementation of printing arises after the image forming apparatus is instructed to perform the printing, the implementation of printing on the image forming apparatus is at least stopped.

SUMMARY

According to an aspect of the present disclosure, an electronic device includes a display device, a toner color determining section, a degree-of-recommendation determining section, and a degree-of-recommendation display section.

The toner color determining section is configured to determine, from print data of an image forming apparatus, one or more use toner colors which are colors of toners for use during printing based on the print data.

The degree-of-recommendation determining section is configured to determine a degree of recommendation of the image forming apparatus according to a probability of a situation preventing implementation of the printing on the image forming apparatus.

The degree-of-recommendation display section is configured to allow the display device to display the degree of recommendation determined by the degree-of-recommendation determining section.

In addition, the degree-of-recommendation determining section is further configured to acquire apparatus information about the image forming apparatus from a server on a network and determine the probability according to whether or not information, included in the apparatus information, on the toners of the use toner colors determined by the toner color determining section meets a specified criterion.

According to an another aspect of the present disclosure, a non-transitory computer-readable recording medium stores a degree-of-recommendation display program causing a computer to function as the above-described toner color determining section, the above-described degree-of-recommendation determining section, and the above-described degree-of-recommendation display section.

According to a yet another aspect of the present disclosure, an image forming system includes an electronic device, an image forming apparatus, a toner color determining section, a degree-of-recommendation determining section, and a degree-of-recommendation display section.

The electronic device includes a display device.

The image forming apparatus is configured to perform printing on a recording medium based on print data.

The toner color determining section is configured to determine, from the print data of the image forming apparatus, one or more use toner colors which are colors of toners for use during printing based on the print data.

The degree-of-recommendation determining section is configured to determine a degree of recommendation of the image forming apparatus according to a probability of a situation preventing implementation of the printing on the image forming apparatus.

The degree-of-recommendation display section is configured to allow the display device to display the degree of recommendation determined by the degree-of-recommendation determining section.

In addition, the degree-of-recommendation determining section is further configured to acquire apparatus information about the image forming apparatus from a server on a network and determine the probability according to whether or not information, included in the apparatus information, on the toners of the use toner colors determined by the toner color determining section meets a specified criterion.

BRIEF DESCRIPTION OF THE DRAWINGS

FIG. 4 is a schematic diagram illustrating an example of apparatus information in FIG. 3.

DETAILED DESCRIPTION

Hereinafter, a description will be given of an electronic device, an image forming system, and a computer-readable non-transitory recording medium with a degree-of-recommendation display program stored thereon, all according to an embodiment as aspects of the present disclosure, with reference to the drawings.

Figure 1:
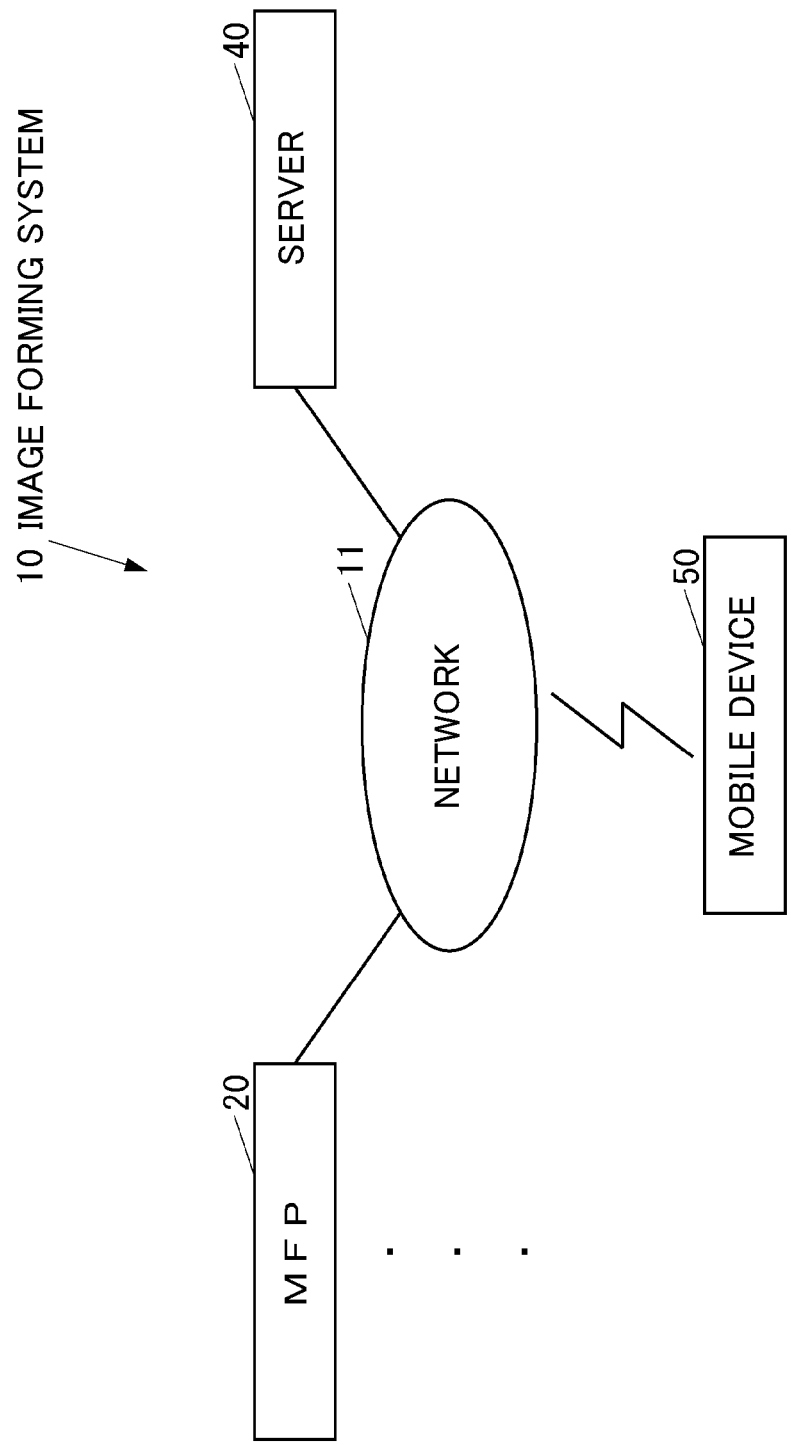
FIG. 1 is a schematic diagram illustrating a configuration of an image forming system according to one embodiment of the present disclosure.

First, a description will be given of the configuration of an image forming system according to this embodiment. FIG. 1 is a schematic diagram illustrating a configuration of the image forming system 10 according to this embodiment.

As illustrated in FIG. 1, the image forming system 10 includes a plurality of MFPs (multifunction peripherals) including an MFP 20 serving as an image forming apparatus for performing printing on a recording medium based on print data, a server 40, such as a PC, operable to manage the plurality of MFPs, and a mobile device 50, such as a smartphone. The plurality of MFPs, the server 40, and the mobile device 50 in the image forming system 10 are communicably connected to each other via a network 11, such as a LAN (local area network) or the Internet. The mobile device 50 constitutes the electronic device defined in the present disclosure.

The configuration of each of the plurality of MFPs in the image forming system 10 is the same as that of the MFP 20. Therefore, the following description of the MFP 20 is given as a representative of the plurality of MFPs in the image forming system 10.

Figure 2:
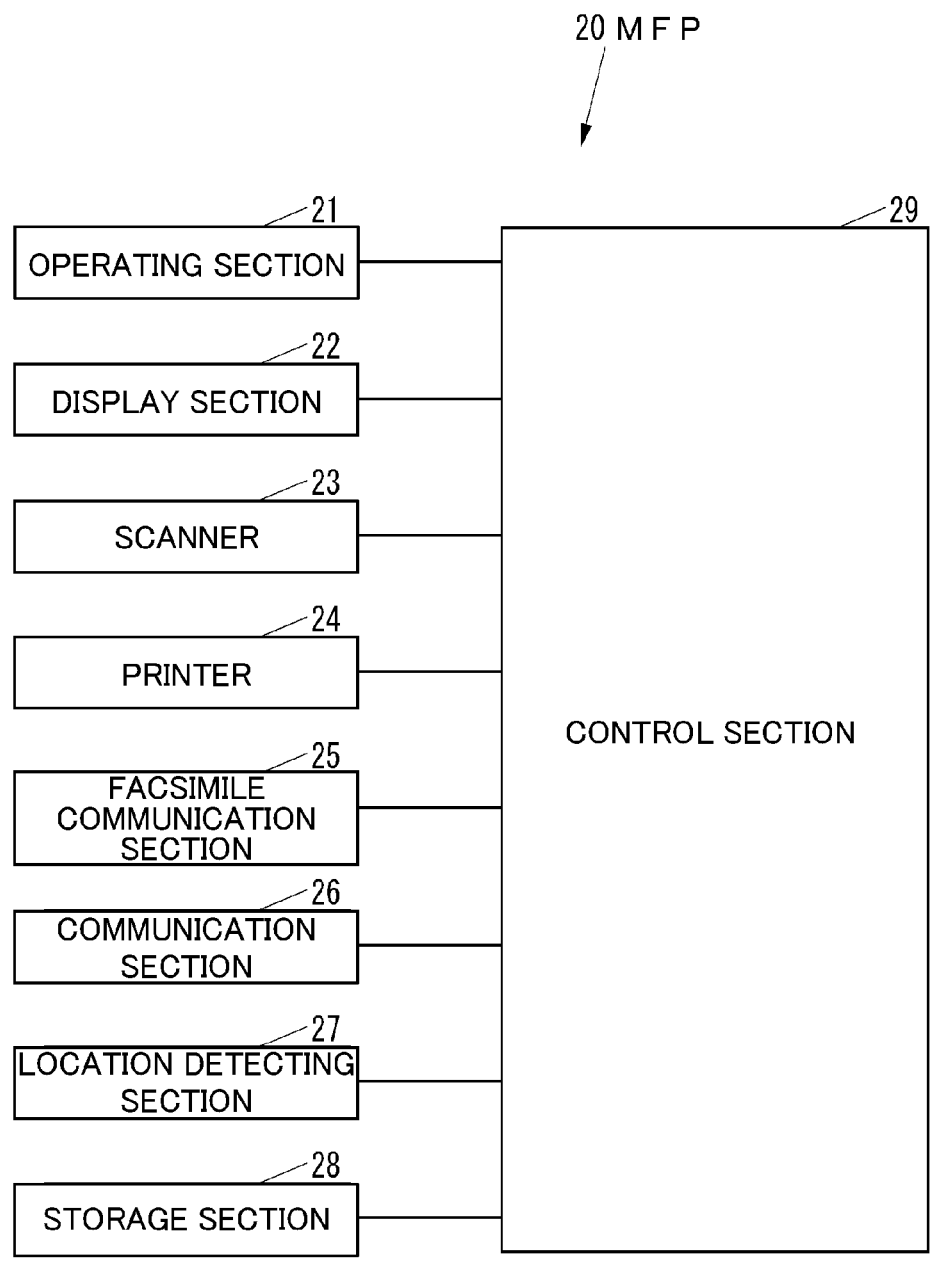
FIG. 2 is a schematic diagram illustrating a block configuration of an MFP in FIG. 1.

FIG. 2 is a schematic diagram illustrating a block configuration of the MFP 20. As illustrated in FIG. 2, the MFP 20 includes an operating section 21, a display section 22, a scanner 23, a printer 24, a facsimile communication section 25, a communication section 26, a location detecting section 27, a storage section 28, and a control section 29.

The operating section 21 is an input device, including buttons, through which various operations are to be input by a user. The display section 22 is a display device, such as an LCD (liquid crystal display), capable of displaying various types of information. The scanner 23 is a scanning device configured to scan an image from an original document. The printer 24 is a printing device configured to perform printing on a recording medium, such as a paper sheet.

The facsimile communication section 25 is a facsimile device configured to communicate by facsimile via a communication line, such as a public phone line, with not-illustrated external facsimile devices.

The communication section 26 is a communication device capable of communicating via the network 11 (see FIG. 1) with external devices. The location detecting section 27 is a location detecting device, such as a GPS (global positioning system) receiver, configured to detect the present location of the MFP 20 in the real space.

The storage section 28 is a non-volatile storage device, such as an EEPROM (electrically erasable programmable read only memory (registered trademark)) or an HDD (hard disk drive), in which various types of data are stored.

The control section 29 is configured to control the whole of the MFP 20.

The printer 24 is a device configured to perform printing by fixing by heat toner transferred to a recording medium. The printer 24 includes: not-illustrated cyan (C), magenta (M), yellow (Y), and black (K) toner cartridges configured to supply cyan toner, magenta toner, yellow toner, and black toner, respectively; not-illustrated photoconductors on the surfaces of which toner images to be transferred to a recording medium can be formed; not-illustrated developing devices configured to supply the toners supplied from the respective toner cartridges to the respective photoconductors; a not-illustrated waste toner bottle capable of accumulating surplus toner produced during printing for the purpose of disposal; and not-illustrated cyan, magenta, yellow, and black fixation devices configured to fix the cyan toner, the magenta toner, the yellow toner, and the black toner on the recording medium by heat.

The control section 29 includes, for example, a CPU (central processing unit), a ROM (read only memory) storing a program and various types of data, and a RAM (random access memory) for use as a workspace for the CPU. The CPU can execute the program stored in the ROM or the storage section 28.

Figure 3:
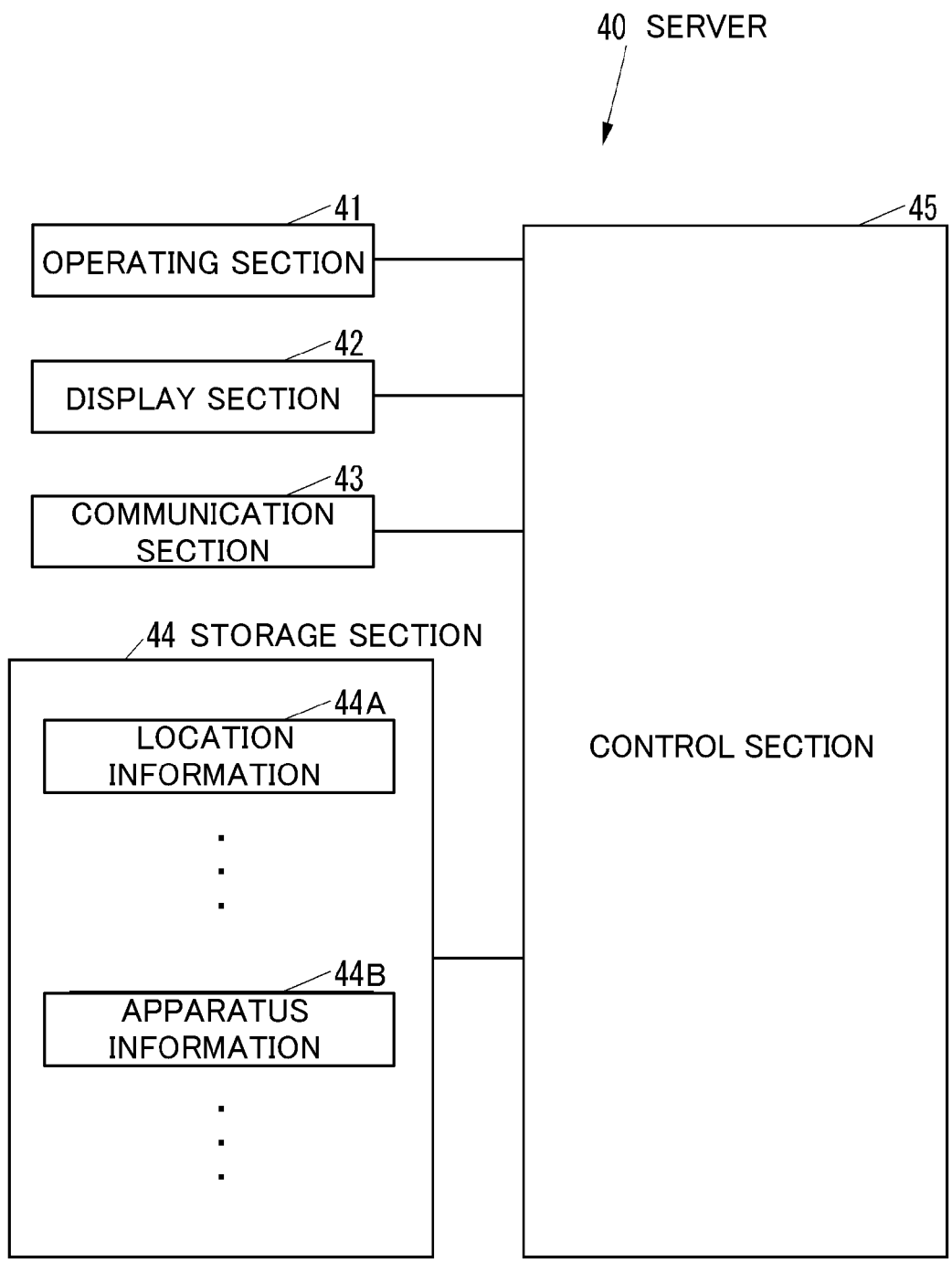
FIG. 3 is a schematic diagram illustrating a block configuration of a server in FIG. 1.

FIG. 3 is a schematic diagram illustrating a block configuration of the server 40. As illustrated in FIG. 3, the server 40 includes: an operating section 41 serving as an input device, such as a mouse and/or a keyboard, through which various operations are to be input by a user; a display section 42 serving as a display device, such as an LCD, configured to display various information; a communication section 43 serving as a communication device capable of communicating via the network 11 (see FIG. 1) with external devices; a storage section 44 serving as a non-volatile storage device, such as an HDD, storing various types of data; and a control section 45 configured to control the whole of the server 40.

The storage section 44 stores, on an MFP-by-MFP basis of the image forming system 10, location information 44A on the MFP in association with identification information on the MFP. The control section of each MFP detects the location information on itself using its location detecting section and transmits the detected location information via its communication section to the server 40. Therefore, the storage section 44 stores the location information 44A transmitted from each MFP to the server 40 and written by the control section 45.

The storage section 44 also stores, on an MFP-by-MFP basis of the image forming system 10, apparatus information 44B on the MFP in association with the identification information on the MFP. The control section of the MFP periodically acquires the apparatus information on itself and transmits the acquired apparatus information via the communication section to the server 40. Therefore, the storage section 44 stores the apparatus information 44B transmitted from each MFP to the server 40 and written by the control section 45.

The control section 45 includes, for example, a CPU, a ROM storing a program and various types of data, and a RAM for use as a workspace for the CPU. The CPU can execute the program stored in the ROM or the storage section 44.

FIG. 4 is a schematic diagram illustrating an example of the apparatus information 44B. As illustrated in FIG. 4, the apparatus information 44B includes "Apparatus Specification Information" indicating the specification of the MFP, "Maintenance Implementation Information" indicating the contents of maintenance performed on the MFP, "Apparatus Status Information" indicating the status of the MFP, "Member Exchange Information" indicating the contents of member exchange performed on the MFP, "Toner Level Information" indicating the residual toner levels in the toner cartridges of the MFP, and "Waste Toner Bottle Usage Information" indicating the use rate of the waste toner bottle of the MFP.

The apparatus specification information includes: the "Name" of the MFP; "Color/B&W" data indicating whether the MFP is a color machine capable of performing multi-color printing or not, that is, the MFP is a black-and-white machine exclusively for black-and-white printing; and "Linear Speed" indicating the printing speed of the MFP. The example illustrated in FIG. 4 indicates that the MFP having a name specified as "XXXX" is a color machine having a linear speed of 26 ppm (pages per minute) during multicolor printing and a linear speed of 26 ppm during black-and-white printing.

The maintenance implementation information includes: the contents of implementation of "Forced Toner Supply" in which toner was forcedly supplied from each toner cartridge to the associated developing device; and the contents of implementation of "Calibration" in which the density characteristic of toner for use in printing was calibrated.

The forced toner supply is a maintenance for stabilizing the print quality by forcedly supplying toner from each toner cartridge to the associated developing device when the developing device is short of toner supplied from the toner cartridge. The forced toner supply may be automatically started by the MFP or manually started by a user. When the implementation of forced toner supply becomes necessary, the MFP stops printing until the implementation of forced toner supply is finished. The example illustrated in FIG. 4 indicates that the forced toner supply for cyan was performed 30 times in the last five days and the last implementation time is an hour ago. The example also indicates that the forced toner supply for magenta was not performed for the last five days and the last implementation time is 20 days ago. The example also indicates that the forced toner supply for yellow was not performed for the last five days and the last implementation time is 15 days ago. The example also indicates that the forced toner supply for black was performed once in the last five days and the last implementation time is three days ago.

The calibration is a maintenance for stabilizing the print quality by calibrating the density characteristic of toner for use in printing when the density characteristic of the toner is deviated from a specific density characteristic. The calibration may be automatically started by the MFP or manually started by the user. When the implementation of calibration becomes necessary, the MFP stops printing until the implementation of calibration is finished. The example illustrated in FIG. 4 indicates that the calibration was performed 83 times in the last five days and the last implementation time is four hours ago.

The apparatus status information includes the temperature of the fixation devices of the MFP, that is, the fixation temperature. The example illustrated in FIG. 4 indicates that the fixation temperature is 20° C.

The member exchange information includes the contents of exchange of the "Toner Cartridges" of the MFP and the contents of exchange of the "Fixation Devices" of the MFP. The example illustrated in FIG. 4 indicates that the exchange of toner cartridges for cyan was not yet performed heretofore. The example also indicates that the exchange of toner cartridges for magenta was performed once heretofore and the last exchange time is at 10:00 on Jul. 11, 2014. The example also indicates that the exchange of toner cartridges for yellow was performed three times heretofore and the last exchange time is at 15:00 on Nov. 15, 2014. The example also indicates that the exchange of toner cartridges for black was performed 20 times heretofore and the last exchange time is at 9:00 on Aug. 30, 2014. Furthermore, the example indicates that the exchange of fixation devices for cyan was performed once heretofore and the last exchange time is at 11:00 on Nov. 20, 2014. The example also indicates that the exchange of fixation devices for magenta was not yet performed heretofore. The example also indicates that the exchange of fixation devices for yellow was not yet performed heretofore. The example also indicates that the exchange of fixation devices for black was performed twice heretofore and the last exchange time is at 8:30 on Aug. 30, 2014.

The example illustrated in FIG. 4 indicates that the residual toner levels in the cyan, magenta, yellow, and black toner cartridges are 2%, 66%, 55%, and 69%, respectively.

The example illustrated in FIG. 4 indicates that the use rate of the waste toner bottle is 10%.

Figure 5:
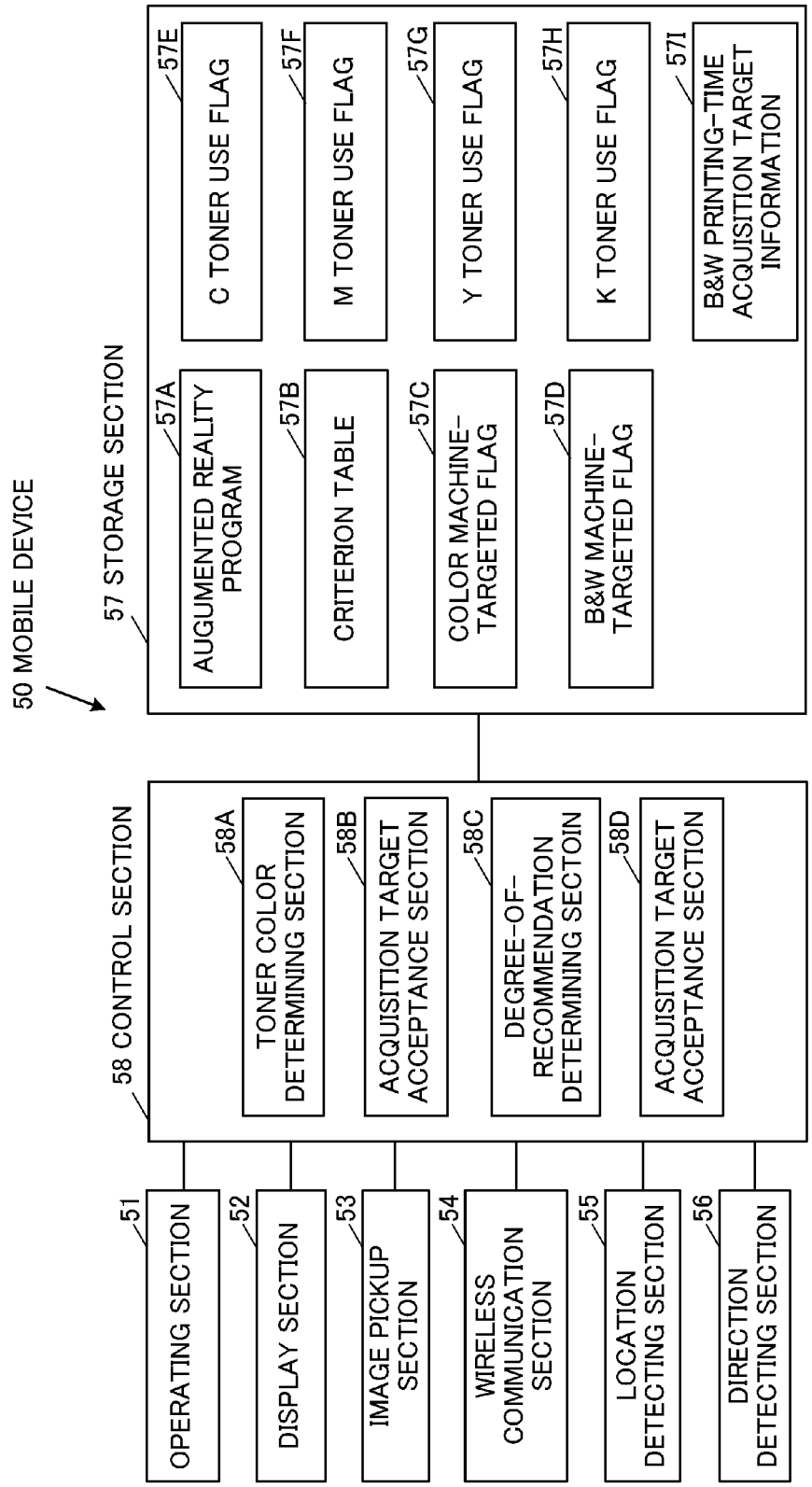
FIG. 5 is a schematic diagram illustrating a block configuration of a mobile device in FIG. 1.

FIG. 5 is a schematic diagram illustrating a block configuration of the mobile device 50. As illustrated in FIG. 5, the mobile device 50 includes: an operating section 51 serving as an input device, including buttons, through which various operations are to be input; a display section 52 serving as a display device, such as an LCD, configured to display various information; an image pickup section 53 serving as an image pickup device; a wireless communication section 54 serving as a communication device capable of communicating via the network 11 (see FIG. 1) with external devices by wireless communication; a location detecting section 55 serving as a location detecting device, such as a GPS receiver, configured to detect the present location of the mobile device 50 in the real space; a direction detecting section 56 serving as a direction detecting device, such as an acceleration sensor, configured to detect the present direction of movement of the mobile device 50 in the real space; a storage section 57 serving as a non-volatile storage device, such as an HDD, storing a program and various types of data; and a control section 58 configured to control the whole of the mobile device 50.

The operating section 51 includes an input device forming a touch panel together with the display section 52.

The storage section 57 stores an augmented reality (AR) program 57A to be executed by the control section 58. The AR program 57A may be installed on the mobile device 50 during the stage of production of the mobile device 50, may be additionally installed on the mobile device 50 from an external storage medium, such as a USB (universal serial bus) memory, or may be additionally installed on the mobile device 50 over the network 11.

The storage section 57 can store a criterion table 57B indicating the criteria for the degrees of recommendation of the MFPs.

The storage section 57 can also store: a color machine-targeted flag 57C indicating whether or not color machines are target MFPs about which apparatus information is to be acquired; a black-and-white machine-targeted flag 57D indicating whether or not black-and-white machines are target MFPs about which apparatus information is to be acquired; a C toner use flag 57E indicating whether or not to use cyan toner; an M toner use flag 57F indicating whether or not to use magenta toner; a Y toner use flag 57G indicating whether or not to use yellow toner; a K toner use flag 57H indicating whether or not to use black toner; and B&W printing-time acquisition target information 57I indicating target MFPs about which apparatus information is to be acquired when the toner color to be used is black only.

The control section 58 includes, for example, a CPU, a ROM storing a program and various types of data, and a RAM for use as a workspace for the CPU. The CPU can execute the program stored in the ROM or the storage section 57.

The control section 58 can execute the AR program 57A stored in the storage section 57 to function as: a toner color determining section 58A configured to determine from print data one or more use toner colors which are the colors of toners for use during printing on the MFP based on the print data; an acquisition target acceptance section 58B configured to accept target MFPs about which apparatus information is to be acquired when the use toner color determined by the toner color determining section 58A is black only; a degree-of-recommendation determining section 58C configured to determine the degrees of recommendation of MFPs according to the probability of a situation preventing the implementation of printing on each of the MFPs; and an augmented reality processing section 58D serving as a degree-of-recommendation display section allowing the display section 52 to display a synthetic image in which the degree of recommendation of each MFP determined by the degree-of-recommendation determining section 58C is synthesized with an image of the MFP shot by the image pickup section 53 so that the degree of recommendation is located at a position corresponding to the MFP in the shot image.

Figure 13:
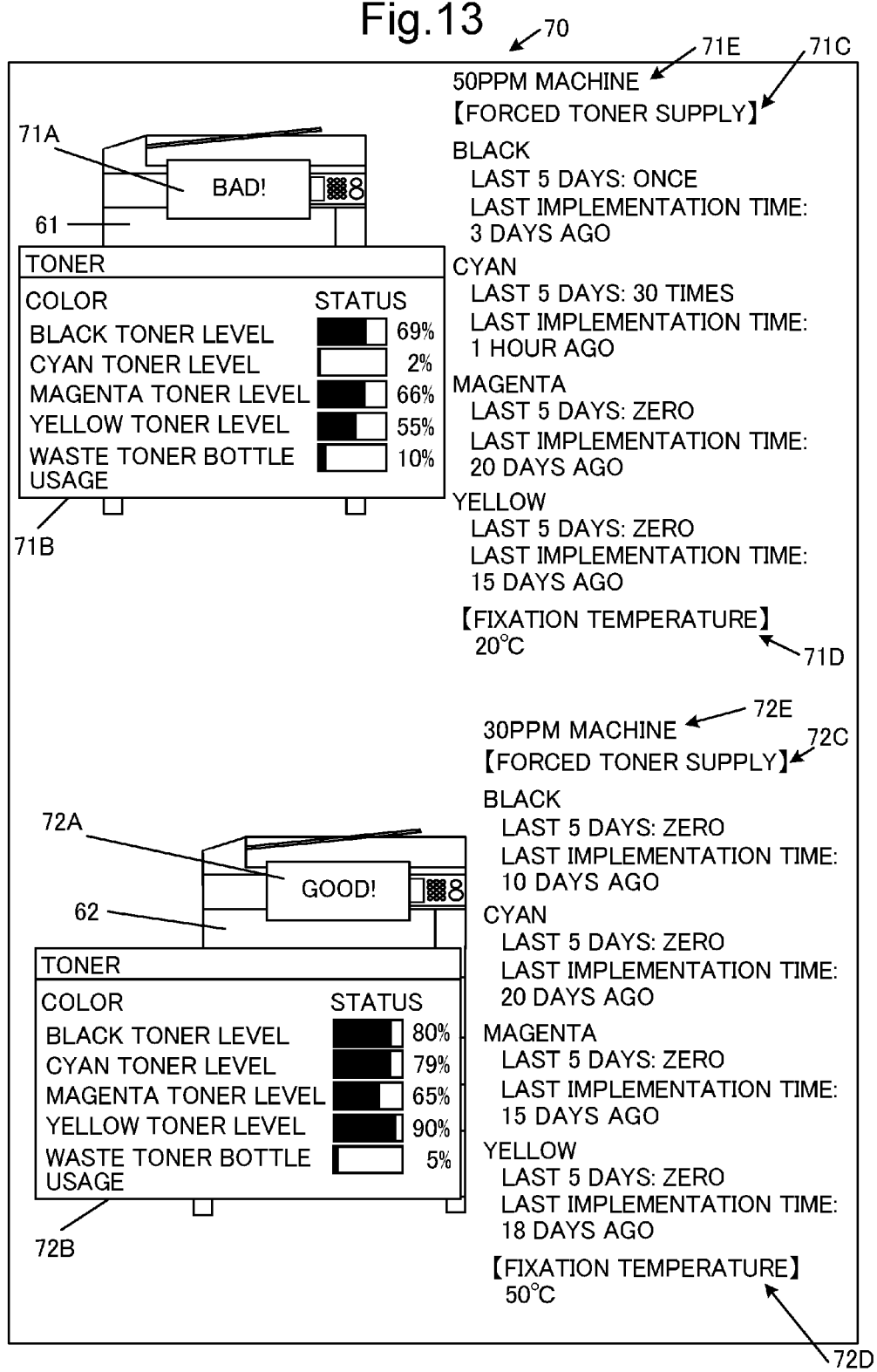
FIG. 13 is a schematic diagram illustrating an example of a synthetic image displayed on the display section in FIG. 5.

The augmented reality processing section 58D allows the display section 52 to display, as illustrated in FIG. 13 to be described hereinafter, a synthetic image 70 in which apparatus information about each MFP is synthesized with an image of the MFP shot by the image pickup section 53, for example, in the form of a location-based AR based on location information or a vision-based AR based on image process.

Figure 6:
FIG. 6 is a tabular diagram illustrating an example of a criterion table in FIG. 5.

FIG. 6 is a tabular diagram illustrating an example of the criterion table 57B. As illustrated in FIG. 6, the criterion table 57B includes "Determination Items" indicating the types of situations preventing the implementation of printing on MFPs, "Criteria" indicating the criteria according to which the probability of each situation indicated in the "Determination Items" is determined to be high, and "Applicability" indicating whether to apply the probability of each situation indicated in the "Determination Items" to the determination of the degrees of recommendation of the MFPs.

The example illustrated in FIG. 6 includes, as the determination items, the above-described forced toner supply and calibration and warm-up for raising the temperature of the fixation devices in order to suitably perform printing.

For example, when an MFP enters a sleep mode, the temperature of the fixation devices gradually decreases. Therefore, when a long time has passed since the MFP entered the sleep mode, the temperature of the fixation devices decreases below a suitable temperature. For this reason, the MFP needs to be warmed up to raise the temperature of the fixation devices. The warm-up is automatically started by the MFP. When the implementation of warm-up becomes necessary, the MFP stops printing until the implementation of warm-up is finished.

In the example illustrated in FIG. 6, the criterion for forced toner supply is that the residual toner level of any toner cartridge is 3% or less and forced toner supply from the toner cartridge has been performed more than ten times in the last five days. The criterion for calibration is that calibration has been performed more than ten times in the last five days and one or more days have passed since the last implementation of calibration. The criterion for warm-up is that the fixation temperature is below 30° C.

The example illustrated in FIG. 6 illustrates that the probabilities of forced toner supply and warm-up are applied to the determination of the degrees of recommendation of the MFPs (ON) and the probability of calibration is not applied to the determination of the degrees of recommendation of the MFPs (OFF).

The criterion table 57B can be freely set according to instructions input through, for example, the operating section 51 of the mobile device 50. For example, in the criterion table 57B, any "Determination Item" can be added or deleted, the setting of the "Applicability" for each determination item can be switched from ON to OFF or vice versa, and the specific contents of each of "Criteria" can be modified.

Next, a description will be given of operations of the image forming system 10.

When a user instructs the mobile device 50 through its operating section 51 to execute the AR program 57A, the control section 58 of the mobile device 50 executes the AR program 57A.

Figure 7:
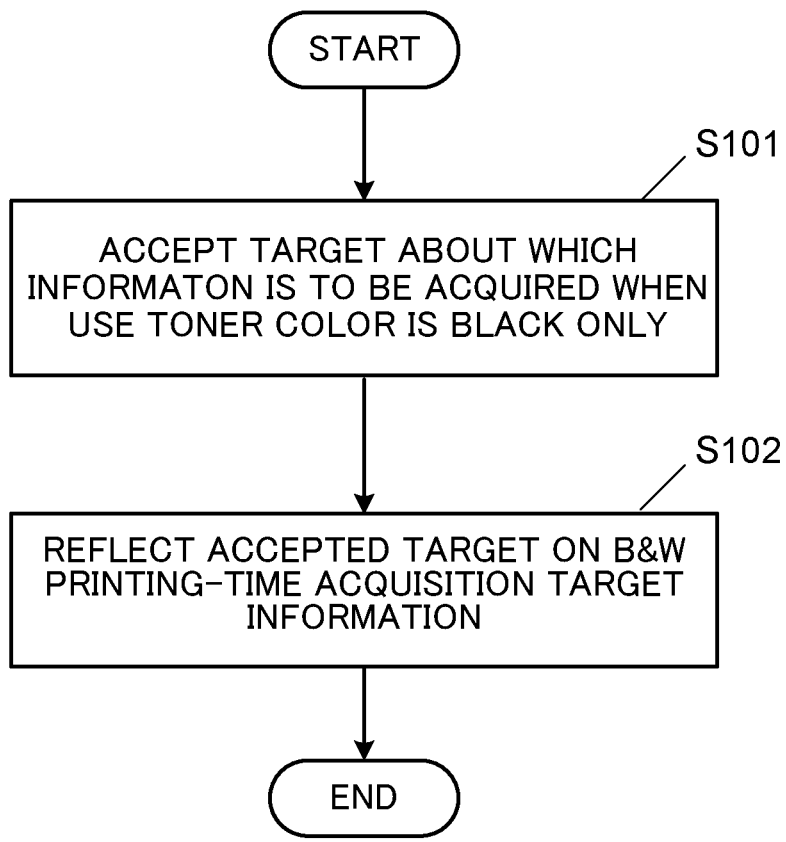
FIG. 7 is a flowchart of an operation of the mobile device of FIG. 5 in setting B&W printing-time acquisition target information.

When the user instructs the mobile device 50 through the operating section 51 to set the B&W printing-time acquisition target information 57I while the control section 58 executes the AR program 57A, the control section 58 executes an operation illustrated in FIG. 7.

FIG. 7 is a flowchart of an operation of the mobile device 50 of FIG. 5 in setting the B&W printing-time acquisition target information 57I. As illustrated in FIG. 7, the acquisition target acceptance section 58B of the mobile device 50 accepts through the operating section 51 target MFPs about which apparatus information is to be acquired when the use toner color is black only (S101). In this case, the acquisition target acceptance section 58B can accept as the target MFPs black-and-white machines only or both of the black-and-white machines and color machines.

Next, the acquisition target acceptance section 58B reflects the target MFPs accepted in S101 on the B&W printing-time acquisition target information 57I (S102). Specifically, if the target MFPs accepted in S101 are black-and-white machines only, the acquisition target acceptance section 58B sets the contents of the B&W printing-time acquisition target information 57I to "BLACK-AND-WHITE MACHINES". On the other hand, if the target MFPs accepted in S101 are both of black-and-white machines and color machines, the acquisition target acceptance section 58B sets the contents of the B&W printing-time acquisition target information 57I to "BLACK-AND-WHITE MACHINES AND COLOR MACHINES".

After the process in S102, the acquisition target acceptance section 58B ends the operation illustrated in FIG. 7.

Figure 8:
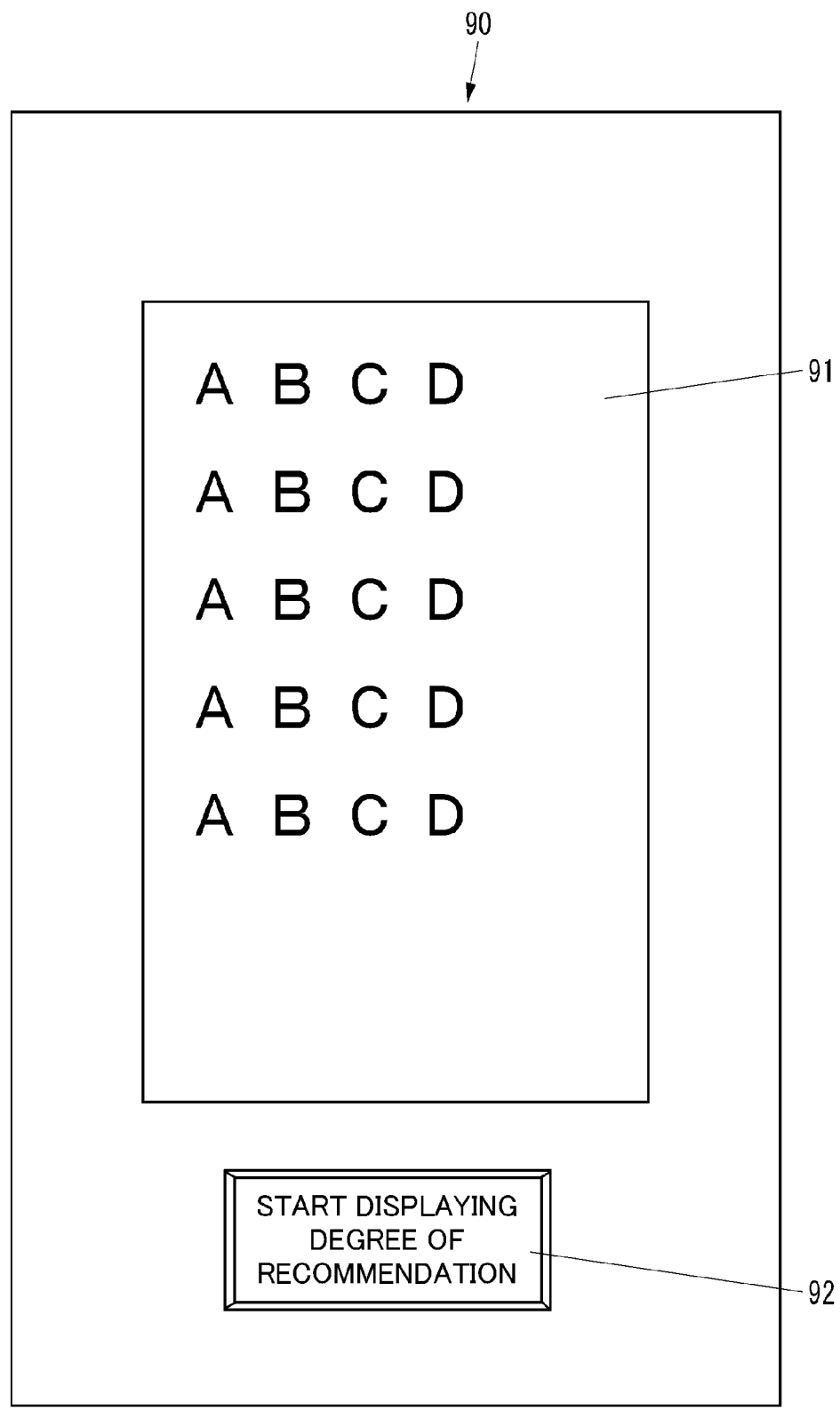
FIG. 8 is a schematic diagram of an example of a preview screen displayed on a display section in FIG. 5.

While the control section 58 executes the AR program 57A, the user can instruct the mobile device 50 through the operating section 51 to display a preview screen including an image to be printed based on the target print data. Therefore, as illustrated in FIG. 8, the control section 58 of the mobile device 50 allows the display section 52 to display a preview screen 90 including an image 91 to be printed based on the target print data. In this case, the preview screen 90 includes a button 92 for displaying the degrees of recommendation of MFPs. Then, when the user pushes the button 92 through the operating section 51, the control section 58 executes an operation illustrated in FIGS. 9 and 10.

Figure 9:
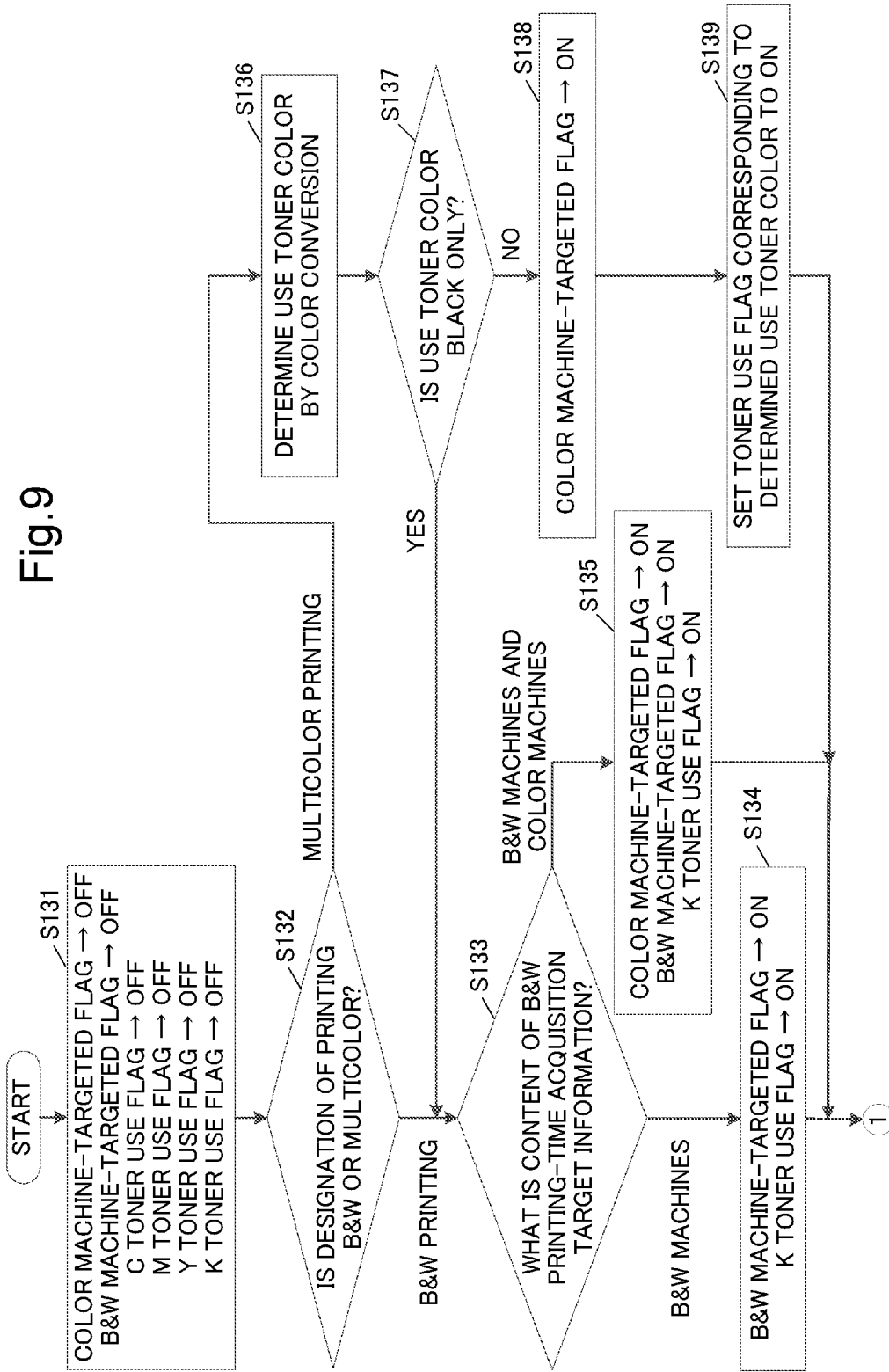
FIG. 9 is a flowchart of an operation of the mobile device of FIG. 5 in displaying the degrees of recommendation of MFPs.
Figure 10:
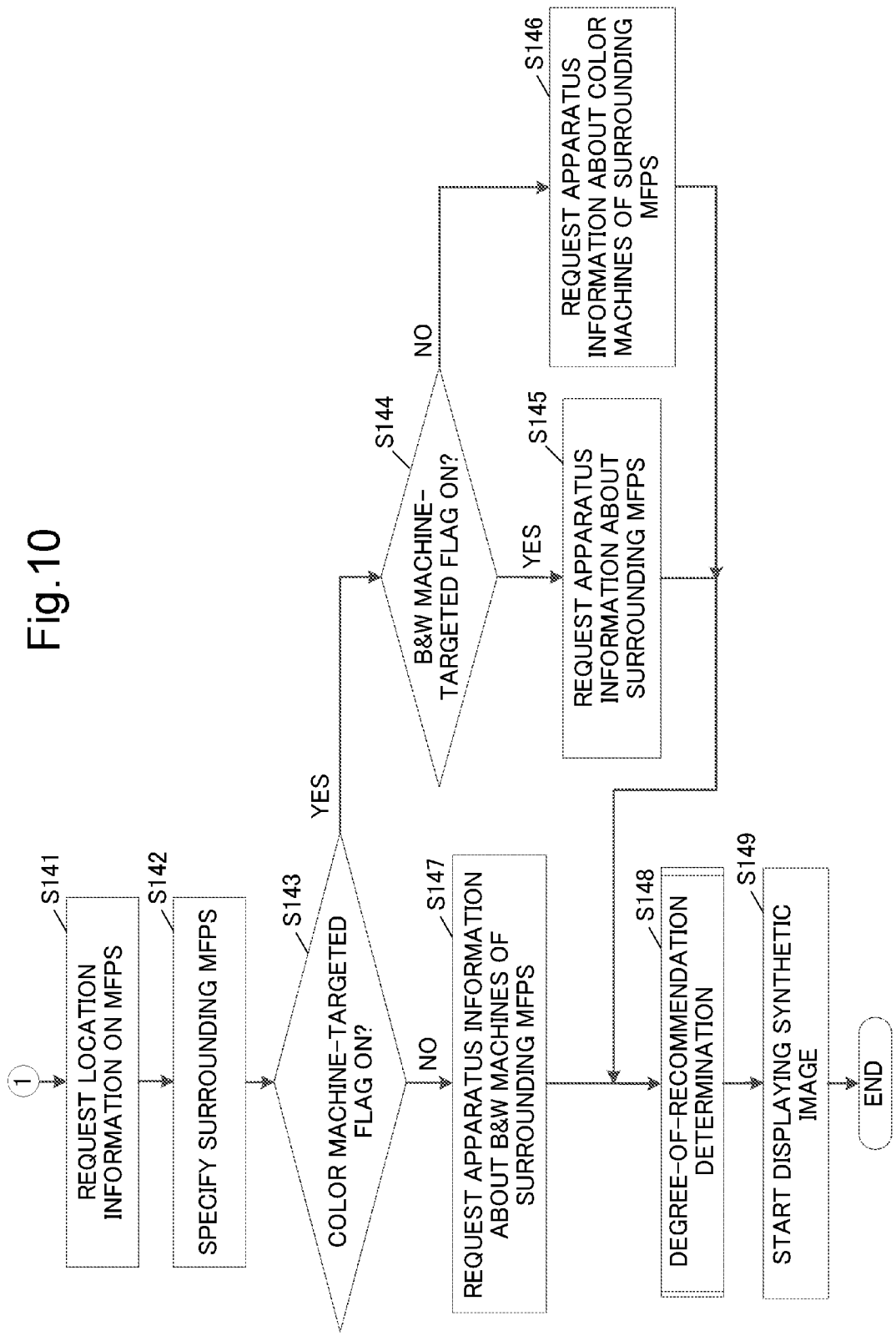
FIG. 10 is a continued flowchart of the operation in FIG. 9.

FIG. 9 is a flowchart of the operation of the mobile device 50 in displaying the degrees of recommendation of MFPs. FIG. 10 is a continued flowchart of the operation illustrated in FIG. 9.

As illustrated in FIGS. 9 and 10, the toner color determining section 58A of the mobile device 50 sets all of the color machine-targeted flag 57C, the black-and-white machine-targeted flag 57D, the C toner use flag 57E, the M toner use flag 57F, the Y toner use flag 57Q and the K toner use flag 57H to OFF (S131).

Next, the toner color determining section 58A determines which of black-and-white printing or multicolor printing is a type of printing to be performed based on a designation of printing included in the target print data (S132).

If in S132 the toner color determining section 58A determines that the black-and-white printing is the type of printing to be performed, it determines what is the content of the B&W printing-time acquisition target information 57I (S133).

If in S133 the toner color determining section 58A determines that the contents of the B&W printing-time acquisition target information 57I are "BLACK-AND-WHITE MACHINES", it sets the black-and-white machine-targeted flag 57D and the K toner use flag 57H to ON (S134).

If in S133 the toner color determining section 58A determines that the contents of the B&W printing-time acquisition target information 57I are "BLACK-AND-WHITE MACHINES AND COLOR MACHINES", it sets the color machine-targeted flag 57C, the black-and-white machine-targeted flag 57D, and the K toner use flag 57H to ON (S135).

If in S132 the toner color determining section 58A determines that the multicolor printing is the type of printing to be performed, it subjects the target print data to color conversion and thus determines one or more use toner colors which are the colors of toners for use during printing on MFPs based on the target print data (S136).

Next, the toner color determining section 58A determines whether or not the use toner color determined in S136 is black only (S137).

If in S137 the toner color determining section 58A determines that the use toner color is black only, it executes the process in S133.

If in S137 the toner color determining section 58A determines that the use toner color is not black only, it sets the color machine-targeted flag 57C to ON (S138).

Next, the toner color determining section 58A sets one or more toner use flags corresponding to the one or more use toner colors determined in S136 to ON (S139). Specifically, if the toner color determining section 58A determines that cyan is at least one of the use toner colors, it sets the C toner use flag 57E to ON. If the toner color determining section 58A determines that magenta is at least one of the use toner colors, it sets the M toner use flag 57F to ON. If the toner color determining section 58A determines that yellow is at least one of the use toner colors, it sets the Y toner use flag 57G to ON. If the toner color determining section 58A determines that black is at least one of the use toner colors, it sets the K toner use flag 57H to ON.

After the process in S134, S135 or S139, the augmented reality processing section 58D of the mobile device 50 requests the server 40 to send location information on MFPs being managed by the server 40 (S141). Thus, the server 40 sends to the mobile device 50 location information 44A on each MFP stored in the storage section 44 and identification information associated with the location information 44A.

When receiving the location information requested in S141, the augmented reality processing section 58D specifies, based on the received location information on the MFPs and the present location of the mobile device 50 detected by the location detecting section 55, MFPs existing within a specific range from the mobile device 50 (S142).

Next, the augmented reality processing section 58D determines whether or not the color machine-targeted flag 57C is ON (S143).

If in S143 the augmented reality processing section 58D determines that the color machine-targeted flag 57C is ON, it determines whether or not the black-and-white machine-targeted flag 57D is ON (S144).

If in S144 the augmented reality processing section 58D determines that the black-and-white machine-targeted flag 57D is ON, it requests the server 40 to send apparatus information about the MFPs specified in S142 (S145). In this case, the augmented reality processing section 58D gives the server 40 the instruction to send apparatus information about the target MFPs, using the identification information received together with the location information requested in S141. Thus, the server 40 specifies, based on the identification information, the MFPs about which the apparatus information has been requested in S145 and sends to the mobile device 50 the apparatus information 44B about the specified MFPs.

If in S144 the augmented reality processing section 58D determines that the black-and-white machine-targeted flag 57D is not ON, it requests the server 40 to send apparatus information about color machines only of the MFPs specified in S142 (S146). In this case, the augmented reality processing section 58D gives the server 40 the instruction to send apparatus information about the target MFPs, using the identification information received together with the location information requested in S141. Thus, the server 40 specifies, based on the identification information, the target MFPs, i.e., color machines about which the apparatus information has been requested in S146, and sends to the mobile device 50 the apparatus information 44B about the specified color machines.

If in S143 the augmented reality processing section 58D determines that the color machine-targeted flag 57C is not ON, it requests the server 40 to send apparatus information about black-and-white machines only of the MFPs specified in S142 (S147). In this case, the augmented reality processing section 58D gives the server 40 the instruction to send apparatus information about the target MFPs, using the identification information received together with the location information requested in S141. Thus, the server 40 specifies, based on the identification information, the target MFPs, i.e., black-and-white machines about which the apparatus information has been requested in S147, and sends to the mobile device 50 the apparatus information 44B about the specified black-and-white machines.

Although in the above the augmented reality processing section 58D specifies MFPs existing within a specific range from the mobile device 50, the server 40 may specify them. Specifically, when the augmented reality processing section 58D sends to the server 40 the present location of the mobile device 50 detected by the location detecting section 55, the server 40 may specify MFPs existing within the specific range from the mobile device 50 based on the present location of the mobile device 50 received from the mobile device 50 and the location information 44A stored in the storage section 44 and send the apparatus information 44B about the specified MFPs to the mobile device 50.

When the degree-of-recommendation determining section 58C of the mobile device 50 receives the apparatus information about the MFPs from the server 40, it executes degree-of-recommendation determination process for determining the degrees of recommendation of the MFPs based on the received apparatus information and the criterion table 57B (S148).

Figure 11:
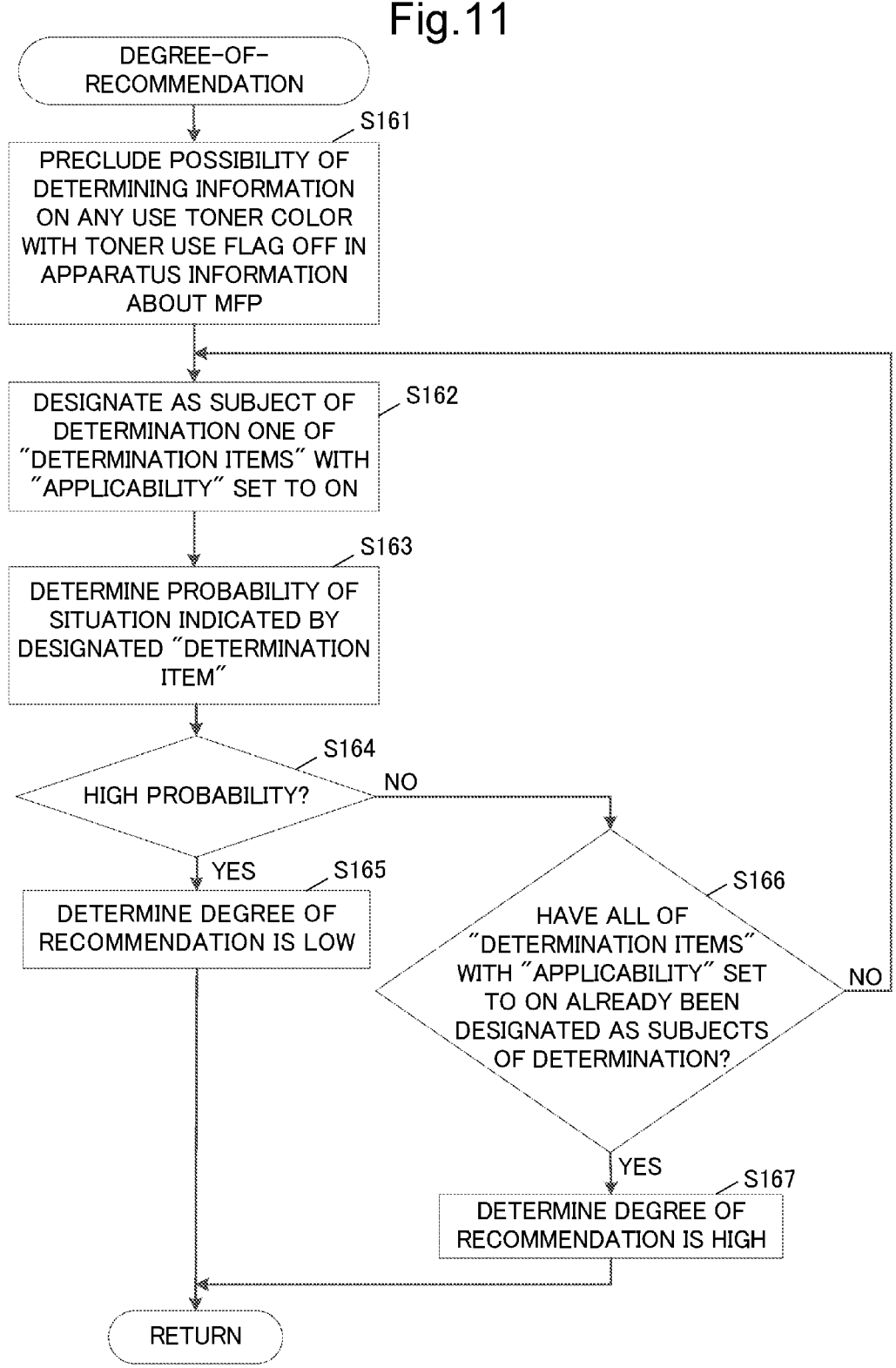
FIG. 11 is a flowchart of degree-of-recommendation determination process in FIG. 10.

FIG. 11 is a flowchart of the degree-of-recommendation determination process illustrated in FIG. 10.

As illustrated in FIG. 11, the degree-of-recommendation determining section 58C precludes the possibility of subsequent determinations for, in the apparatus information about each MFP received from the server 40, information on any use toner color with its toner use flag OFF (S161). For example, if the C toner use flag 57E is OFF, the degree-of-recommendation determining section 58C precludes the possibility of subsequent determinations for, in the apparatus information about each MFP received from the server 40, information on "Forced Toner Supply" for cyan included in "Maintenance Implementation Information", the contents of exchange of "Toner Cartridges" for cyan included in "Member Exchange Information", the contents of exchange of "Fixation Devices" for cyan included in "Member Exchange Information", and the residual toner level for cyan included in "Toner Level Information". Although the above description has been given taking cyan as an example, the same applies to magenta, yellow, and black.

After the process in S161, the degree-of-recommendation determining section 58C designates as a subject of determination one of "Determination Items" with "Applicability" set to ON in the criterion table 57B (S162).

Next, the degree-of-recommendation determining section 58C determines the probability of the situation indicated by the "Determination Item" designated as a subject of determination in S162, based on the "Criterion" of the "Determination Item" designated as the subject of determination in S162 and the information on the MFP obtained by, in S161, excluding the specific pieces of information from the apparatus information about the MFP received from the server 40 (S163).

Next, the degree-of-recommendation determining section 58C determines whether or not the probability of the situation indicated by the "Determination Item" designated as the subject of determination in S162 has been determined to be high in S163 (S164).

If in S164 the degree-of-recommendation determining section 58C determines that the probability of the situation indicated by the "Determination Item" designated as the subject of determination in S162 has been determined to be high in S163, it determines that the degree of recommendation of the MFP is low (S165) and ends the operation illustrated in FIG. 11.

If in S164 the degree-of-recommendation determining section 58C determines that the probability of the situation indicated by the "Determination Item" designated as the subject of determination in S162 has been determined to be low in S163, it determines whether or not all of the "Determination Items" with "Applicability" set to ON in the criterion table 57B have been designated as subjects of determination (S166).

If in S166 the degree-of-recommendation determining section 58C determines that there is any undesignated "Determination Item" with "Applicability" set to ON in the criterion table 57B, it executes the process in S162 for one undesignated "Determination Item" with "Applicability" set to ON in the criterion table 57B.

If in S166 the degree-of-recommendation determining section 58C determines that all of the "Determination Items" with "Applicability" set to ON in the criterion table 57B have been designated as subjects of determination, it determines that the degree of recommendation of the MFP is high (S167) and ends the operation illustrated in FIG. 11.

For example, when apparatus information about an MFP received from the server 40 is as illustrated in FIG. 4, the criterion table 57B is as illustrated in FIG. 6, and the C toner use flag 57E is not OFF, the degree-of-recommendation determining section 58C determines in S163 that the probability of forced toner supply for cyan is high, because the residual toner level of the cyan toner cartridge is below 3% and the forced toner supply for cyan has been performed more than ten times in the last five days. Alternatively, because the fixation temperature is below 30° C., the degree-of-recommendation determining section 58C determines in S163 that the probability of warm-up is high. Therefore, the degree-of-recommendation determining section 58C determines in S165 that the degree of recommendation of the MFP is low.

As illustrated in FIGS. 9 and 10, after the process in S148, the augmented reality processing section 58D starts allowing the display section 52 to display a synthetic image in which the degree of recommendation of each MFP determined in S148 and the information on the MFP are synthesized with an image of the MFP shot by the image pickup section 53 so that they are located at a position corresponding to the MFP in the shot image (S149). In this case, the augmented reality processing section 58D identifies the MFP included in the image shot by the image pickup section 53 and the position of this MFP in the shot image, based on the location of the mobile device 50 detected by the location detecting section 55, the direction of image shooting of the image pickup section 53 based on the direction detected by the direction detecting section 56, and the location information on the MFP received from the server 40.

After the process in S149, the augmented reality processing section 58D ends the operation illustrated in FIGS. 9 and 10.

Figure 12:
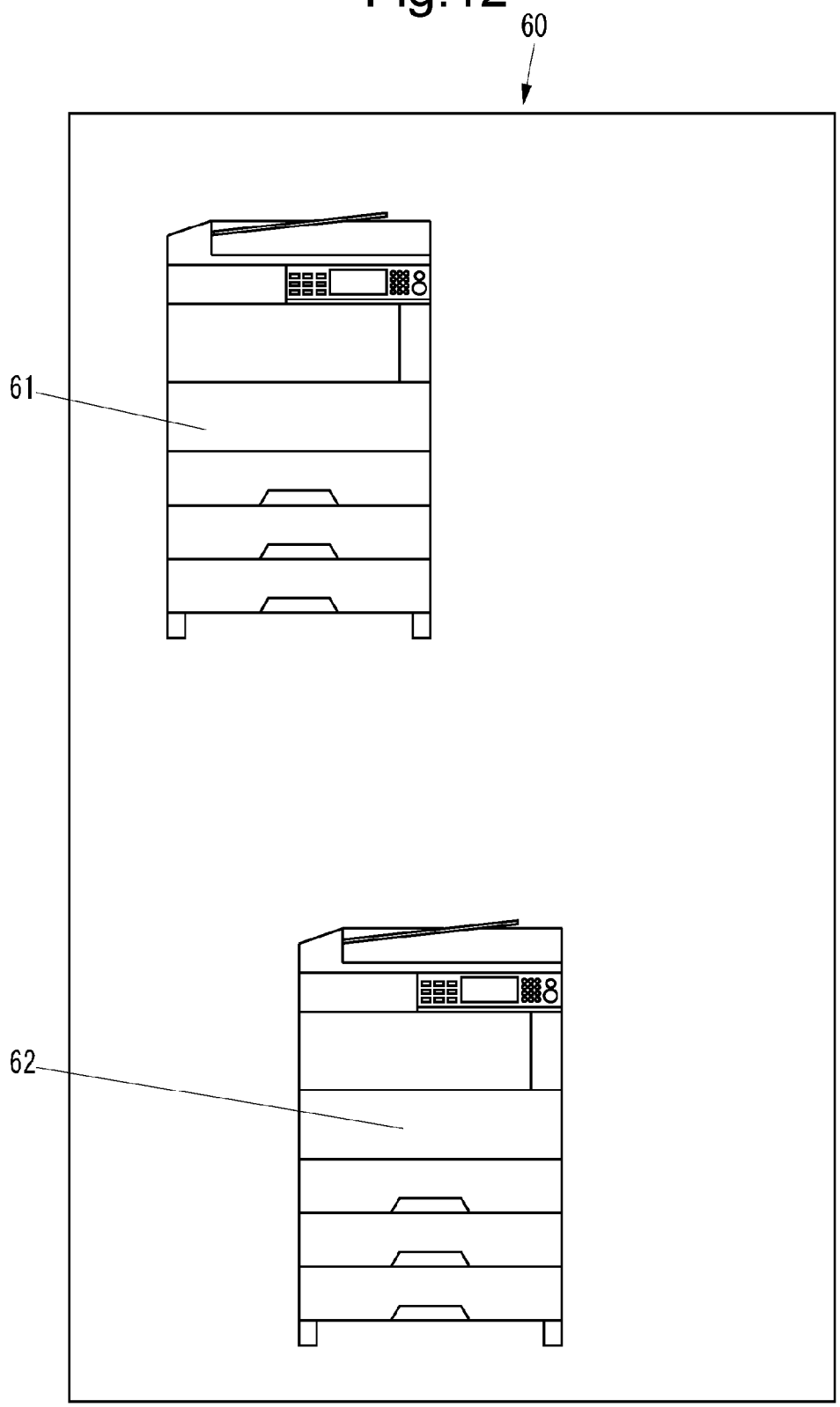
FIG. 12 is a schematic diagram illustrating an example of an image shot by an image pickup section in FIG. 5.

FIG. 12 is a schematic diagram illustrating an example of a shot image shot by the image pickup section 53. FIG. 13 illustrates an example of a synthetic image displayed on the display section 52.

Suppose that as illustrated in FIG. 12 a shot image 60 shot by the image pickup section 53 includes an MFP 61 and an MFP 62. If a shot image shot by the image pickup section 53 is the shot image 60 illustrated in FIG. 12, the augmented reality processing section 58D, in S149, allows the display section 52 to display, for example, a synthetic image 70 illustrated in FIG. 13.

The synthetic image 70 illustrated in FIG. 13 includes: the degree of recommendation 71A of the MFP 61 determined in S148; toner information 71B on toners included in the apparatus information about the MFP 61 received from the server 40; forced toner supply information 71C included in the apparatus information about the MFP 61 received from the server 40 and indicating the contents of forced toner supply performed; fixation temperature information 71D included in the apparatus information about the MFP 61 received from the server 40 and indicating the fixation temperature; printing speed information 71E included in the apparatus information about the MFP 61 received from the server 40 and indicating the printing speed; the degree of recommendation 72A of the MFP 62 determined in S148; toner information 72B on toners included in the apparatus information about the MFP 62 received from the server 40; forced toner supply information 72C included in the apparatus information about the MFP 62 received from the server 40 and indicating the contents of forced toner supply performed; fixation temperature information 72D included in the apparatus information about the MFP 62 received from the server 40 and indicating the fixation temperature; printing speed information 72E included in the apparatus information about the MFP 62 received from the server 40 and indicating the printing speed.

In FIG. 13, the degree of recommendation 71A is represented as "BAD!" indicating that the degree of recommendation of the MFP 61 has been determined to be low. On the other hand, the degree of recommendation 72A is represented as "GOOD!" indicating that the degree of recommendation of the MFP 62 has been determined to be high.

The information on each MFP included in the synthetic image displayed on the display section 52 is information based on at least part of the apparatus information about the MFP received from the server 40. In this case, the information on the MFP included in the synthetic image displayed on the display section 52 preferably includes information used for determining the degree of recommendation of the MFP.

The synthetic image 70 illustrated in FIG. 13 does not include the names of the MFPs. However, the augmented reality processing section 58D may allow the synthetic image 70 to include at least part of apparatus specification information included in the apparatus information about each MFP received from the server 40. The synthetic image 70 illustrated in FIG. 13 includes the printing speed information 71E and 72E, indicating the linear speeds, of the apparatus specification information. Therefore, if both the MFP 61 and the MFP 62 are determined to be "GOOD!", the user can select the MFP having a higher linear speed as the destination of the target print data.

The synthetic image 70 illustrated in FIG. 13 includes two MFPs. However, the synthetic image 70 may include a single or more than two MFPs. For example, in shooting the MFPs one by one with the image pickup section 53, the user of the mobile device 50 can first check the degree of recommendation of the first MFP in a synthetic image displayed on the display section 52 by shooting the first MFP with the image pickup section 53 and then check the degree of recommendation of the second MFP in another synthetic image displayed on the display section 52 by shooting the second MFP with the image pickup section 53.

As thus far described, the image forming system 10 determines the probability of each of various situations preventing the implementation of printing on each MFP based on a specific criterion and the information on the MFP which includes information on one or more use toner colors determined from print data and from which information on one or more toner colors other than the use toner colors has been excluded, and displays a synthetic image in which the degree of recommendation determined according to the determined probability is synthesized at a position corresponding to the MFP in the shot image (S149). Therefore, the user can easily know from the synthetic image the MFP less likely to cause the situations preventing the implementation of printing. Hence, the image forming system 10 enables the user to instruct the MFP capable of smooth printing to perform printing.

The image forming system 10 may not use the AR technique to display the degree of recommendation, apparatus information, and other types of information. In other words, the image forming system 10 may allow the display section 52 to display information only, including the degree of recommendation and apparatus information, without synthesizing it with the shot image.

Since the image forming system 10 determines the probability of each situation preventing the implementation of printing on each MFP based on a specific criterion and the information on the MFP which includes information on one or more use toner colors determined from print data and from which information on one or more toner colors other than the use toner colors has been excluded, it can more appropriately determine the degree of recommendation than a configuration in which MFP information on one or more toner colors other than the use toner colors is used in determining the degree of recommendation.

By a user's instruction to the mobile device 50 to send target print data to the MFP whose degree of recommendation displayed on the display section 52 of the mobile device 50 is "GOOD!", the user can achieve smooth printing using this MFP.

For example, by instructing the MFP whose degree of recommendation displayed on the display section 52 of the mobile device 50 is "GOOD!", that is, the MFP having low probabilities of all of forced toner supply, calibration, and warm-up, to perform printing, the user can reduce the possibility of preventing the implementation of printing due to the occurrence of forced toner supply, calibration or warm-up.

In this embodiment, two levels, "GOOD!" and "BAD!" are used as the degrees of recommendation. However, the image forming system 10 may have three or more degrees of recommendation depending on the settings of the criterion table 57B. For example, the image forming system 10 may set the threshold value of each "Criterion" at a plurality of levels. Thus, the image forming system 10 can determine the probability of the situation indicated in the associated "Determination Item" at three or more levels and determine the degree of recommendation at three or more levels based on the determined probability.

Since the image forming system 10 displays not only the degrees of recommendation but also information serving as bases for the determination of the degrees of recommendation, it enables the user to more appropriately know the MFP less likely to cause the situations preventing the implementation of printing.

If a situation arises where maintenance for an MFP needs to be performed, the implementation of printing on the MFP is stopped for a long time. Since the image forming system 10 displays the degree of recommendation of each MFP determined according to the probability of the situation where maintenance for the MFP needs to be performed, the image forming system 10 enables the user to instruct an MFP capable of smooth printing to perform printing.

In this embodiment, if the "Criterion" of any one of the "Determination Items" with "Applicability" set to ON in the criterion table 57B is satisfied, the image forming system 10 determines that the degree of recommendation of the MFP is low. However, in the case where there are a plurality of "Determination Items" with "Applicability" set to ON in the criterion table 57B, the "Criteria" of how many of the plurality of "Determination Items" need to be satisfied in order to determine the degree of recommendation of the MFP to be low depends on settings. For example, the image forming system 10 may determine the degree of recommendation of the MFP to be low only if the "Criteria" of all of the "Determination Items" with "Applicability" set to ON in the criterion table 57B are satisfied.

The image forming system 10 may employ, as the criteria in the criterion table 57B, criteria other than the criteria illustrated in FIG. 6.

In the example illustrated in FIG. 6, the attainment of the criterion for forced toner supply requires that both of a standard on the residual toner level of any toner cartridge and a standard on the number of implementation times of forced toner supply in a recent specific period of time are satisfied. If the residual toner level of any toner cartridge is small, the quantity of toner that will be supplied from the toner cartridge to the developing device is very likely to become insufficient and, therefore, the implementation of forced toner supply is very likely to become necessary. Therefore, the standard on the residual toner level of any toner cartridge is preferred for the criterion for forced toner supply. Furthermore, a high frequency of implementation of force toner supply means that the implementation of forced toner supply is very likely to become necessary. Therefore, the standard on the number of implementation times of forced toner supply in a recent specific period of time is preferred for the criterion for forced toner supply.

For example, the criterion for forced toner supply may include a standard on the last implementation time of forced toner supply, such as a standard of whether one or more days have passed since the last implementation time of force toner supply. If a long period of time has passed since the last implementation time of forced toner supply, the implementation of forced toner supply is very likely to become necessary soon. Therefore, the standard on the last implementation time of forced toner supply is preferred for the criterion for forced toner supply.

In the example illustrated in FIG. 6, the attainment of the criterion for forced toner supply requires that all of the plurality of standards are satisfied. However, in the case where the criterion for forced toner supply includes a plurality of standards, how many of the plurality of standards needs to be satisfied in order to determine the probability of forced toner supply to be high depends on settings. For example, the attainment of the criterion for forced toner supply may require only that any one of the plurality of standards is satisfied.

In the example illustrated in FIG. 6, the attainment of the criterion for calibration requires that both of a standard on the number of implementation times of calibration in a recent specific period of time and a standard on the last implementation time of calibration are satisfied. A high frequency of implementation of calibration means that the implementation of calibration is very likely to become necessary. Therefore, the standard on the number of implementation times of calibration in a recent specific period of time is preferred for the criterion for calibration. Furthermore, if a long period of time has passed since the last implementation time of calibration, the implementation of calibration is very likely to become necessary soon. Therefore, the standard on the last implementation time of calibration is preferred for the criterion for calibration. In the example illustrated in FIG. 6, the attainment of the criterion for calibration requires that all of the plurality of standards are satisfied. However, in the case where the criterion for calibration includes a plurality of standards, how many of the plurality of standards needs to be satisfied in order to determine the probability of calibration to be high depends on settings. For example, the attainment of the criterion for calibration may require only that any one of the plurality of standards is satisfied.

The image forming system 10 may handle maintenances other than the above-described maintenance. For example, the image forming system 10 may handle "drum refresh" for removing foreign substances, such as dirt, deposited on the surface of a photosensitive drum or "member exchange" for exchanging members.

The drum refresh is a maintenance for stabilizing the print quality by removing foreign substances deposited on the surface of a photosensitive drum when it has been determined that any foreign substance is deposited on the surface of the photosensitive drum. The drum refresh may be automatically started by the MFP or manually started by the user. When the implementation of drum refresh becomes necessary, the MFP stops printing until the implementation of drum refresh is finished.

Possible standards for a criterion for drum refresh include, for example, a standard on the number of implementation times of drum refresh in a recent specific period of time and a standard on the last implementation time of drum refresh. A high frequency of implementation of drum refresh means that the implementation of drum refresh is very likely to become necessary. Therefore, the standard on the number of implementation times of drum refresh in a recent specific period of time is preferred for the criterion for drum refresh. Furthermore, if a long period of time has passed since the last implementation time of drum refresh, the implementation of drum refresh is very likely to become necessary soon. Therefore, the standard on the last implementation time of drum refresh is preferred for the criterion for drum refresh.

The member exchange is a maintenance for replacing an existing member with a new member when the existing member reaches a specific exchange standard. The member exchange is manually performed by the user. For example, when the residual toner level of any toner cartridge reaches 0%, the MFP allows the display section thereof to display an instruction to replace the toner cartridge whose residual toner level has reached 0%. Furthermore, when the use rate of the waste toner bottle reaches 100%, the MFP allows the display section thereof to display an instruction to replace the waste toner bottle. When the member reaches its specific exchange standard, the MFP stops printing until the member exchange is finished.

Possible standards for a criterion for member exchange include, for example, a standard on the number of exchange times of the member and a standard on the last exchange time of the member. If the number of exchange times of the member is large, the MFP may be an MFP the member of which easily fails. Therefore, the standard on the number of exchange times of the member is preferred for the criterion for member exchange. Furthermore, if a short period of time has passed since the last exchange time of the member, the member is a new member and, therefore, the probability of exchange of the member is low. Therefore, the standard on the last exchange time of the member is preferred for the criterion for member exchange.

The description in this embodiment has been given taking the toner cartridge and the fixation device as examples of a member requiring exchange. However, the same applies to members requiring exchange other than the toner cartridge and the fixation device. For example, member exchange information of the apparatus information 44B may include information on the photosensitive drums.

The image forming system 10 may include the history of dates and times of implementation of maintenance in the "Maintenance Implementation Information" of the apparatus information 44B and include a standard on the frequency of implementation of maintenance in the "Criteria" in the criterion table 57B. With this configuration, the mobile device 50 can acquire information on the frequency of implementation of maintenance with high accuracy based on the history of dates and times of implementation of maintenance and can determine the probability of the occurrence of maintenance with high accuracy based on the frequency acquired with high accuracy. Although the description has been given here of the "Maintenance Implementation Information" of the apparatus information 44B, the "Member Exchange Information" of the apparatus information 44B may likewise include the history of dates and times of member exchange.

The image forming system 10 may include the time taken for a single maintenance in the "Maintenance Implementation Information" of the apparatus information 44B. Furthermore, the augmented reality processing section 58D may allow the display section 52 to display a synthetic image in which the time taken for a single maintenance and the degree of recommendation are synthesized with a shot image of the MFP so that they are located at a position corresponding to the MFP in the shot image. With this configuration, since the image forming system 10 displays not only the degrees of recommendation but also the times taken for a single maintenance, it enables the user to know the MFP having a short time taken for maintenance even when a situation preventing the implementation of printing arises. Hence, the image forming system 10 enables the user to instruct the MFP capable of smooth printing to perform printing.

When the use toner colors include one or more colors other than black ("MULTICOLOR PRINTING" in S132 and NO in S137), the image forming system 10 acquires only the apparatus information about color machines (S131, S138, YES in S143, NO in S144, and S146). Therefore, when the user toner colors include one or more colors other than black, the time taken to acquire apparatus information about MFPs can be reduced. Hence, the image forming system 10 can early display the degrees of recommendation of MFPs.

When the use toner color is black only ("B&W PRINTING" in S132 or YES in S137), the image forming system 10 acquires the information about target MFPs accepted by the acquisition target acceptance section 58B (S133 to S135, S143 to S145, and S147). Therefore, in acquiring apparatus information about black-and-white machines only (S147) when the user toner color is black only, the time taken to acquire apparatus information about MFPs can be reduced. Hence, the image forming system 10 can early display the degrees of recommendation of MFPs.

When the use toner color is black only, the image forming system 10 may not accept a user's setting of whether to acquire apparatus information about black-and-white machines or apparatus information about color machines and may instead fix the setting to either one of them.

If the type of printing to be performed can be determined to be black-and-white printing based on the designation of printing included in the print data ("B&W PRINTING" in S132), the image forming system 10 need not determine the use toner color by subjecting the print data to color conversion (S136) and therefore can early determine the use toner color. Hence, the image forming system 10 can early display the degrees of recommendation of MFPs.

Even if the type of printing to be performed can be determined to be black-and-white printing based on the designation of printing included in the print data, the image forming system 10 may determine the use toner color by subjecting the print data to color conversion (S136) in the same manner as in the case where the type of printing can be determined to be multicolor printing based on the designation of printing included in the print data.

Alternatively, the image forming system 10 may determine whether the type of printing to be performed is multicolor printing or black-and-white printing, without determining it based on the designation of printing included in the print data, by determining what is the use toner color by subjecting the print data to color conversion.

In this embodiment, the mobile device 50 acquires, from the server 40 in S145 to S147, apparatus information which the server 40 periodically receives from the MFPs. Therefore, the apparatus information that the mobile device 50 acquires from the server 40 may not be up-to-date. For example, if the server 40 acquires apparatus information from target MFPs at the time when the mobile device 50 requests apparatus information about MFPs from the server 40, the apparatus information that the mobile device 50 acquires from the server 40 is up-to-date.

In this embodiment, the last implementation time of maintenance included in the maintenance implementation information of the apparatus information 44B is represented by how long ago from the present the last maintenance was performed. However, the last implementation time may be represented by the last implementation date and time.

Likewise, in this embodiment, the last exchange time included in the member exchange information of the apparatus information 44B is represented by the last exchange date and time. However, the last exchange time may be represented by how long ago from the present the member exchange was performed.

Although in this embodiment location information is acquired using the GPS, the location information may be acquired using any technique other than the GPS. For example, the image forming system 10 may acquire the location information using Wi-Fi (wireless fidelity) or Bluetooth (registered trademark).

Although in this embodiment the image forming system 10 employs the location-based AR based on location information as the method for augmented reality, it may employ a vision-based AR based on image process.

In the image forming system 10 according to this embodiment, the mobile device 50 determines the degrees of recommendation of MFPs. However, the image forming system 10 may be configured so that the server 40 determines the degrees of recommendation of MFPs and notifies the mobile device 50 of the determination results.

In the image forming system 10, at least one of the functions of the server 40 may be performed by at least one of the plurality of MFPs. If all of the functions of the server 40 are performed by at least one of the plurality of MFPs, the image forming system 10 may not include the server 40. For example, the image forming system 10 may be configured so that each MFP transfers information directly to and from the mobile device 50.

Although in this embodiment the image forming system 10 includes a mobile device as the electronic device of the present disclosure, the image forming system 10 may include any electronic device, such as a PC, other than the mobile device as the electronic device of the present disclosure.

Although in this embodiment the image forming system 10 includes an MFP as the image forming apparatus of the present disclosure, the image forming system 10 may include any image forming apparatus, such as an exclusive printer, other than the MFP as the image forming apparatus of the present disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A mobile device comprising:
   a display device as a liquid crystal display (LCD);
   a non-volatile storage device as a hard disk drive (HDD) that stores an augmented reality (AR) program;
   an image pickup device; and
   a control section including a central processing unit (CPU) configured for executing the AR program stored in the non-volatile storage device as the HDD so as to:
   determine, from print data of an image forming apparatus, one or more use toner colors which are colors of toners for use during printing based on the print data; and
   determine a degree of recommendation of the image forming apparatus according to a probability of a situation preventing implementation of the printing on the image forming apparatus, wherein the display device as the LCD displays a synthetic image in which the degree of recommendation determined is associated with an image of the image forming apparatus shot by the image pickup device;

the control section including the CPU is further configured for executing the AR program stored in the non-volatile storage device as the HDD so as to acquire apparatus information about the image forming apparatus from a server via a network and determine the probability according to whether or not information, included in the apparatus information, on the toners of the use toner colors determined meets a specified criterion, the non-volatile storage device as the HDD stores: (i) a criterion table indicating the criterion for the degree of recommendation; (ii) a color machine-targeted flag; (iii) a black-and-white machine-targeted flag; (iv) a cyan toner use flag indicating whether or not to use cyan toner; (v) a magenta toner use flag indicating whether or not to use magenta toner; (vi) a yellow toner use flag indicating whether or not to use yellow toner; and (vii) a black toner use flag indicating whether or not to use black toner;

the control section including the CPU is configured for executing the AR program stored in the non-volatile storage device as the HDD so as to:
 request the server, if the black-and-white machine-targeted flag is not ON, to send the apparatus information about a color machine only;
 request the server, if the color machine-targeted flag is not ON, to send the apparatus information about a black-and-white machine only; and
 determine the degree of recommendation based on the criterion table and the apparatus information excluding specified apparatus information with the cyan toner use flag being OFF or the magenta toner use flag being OFF or the yellow toner use flag being OFF or the black toner use flag being OFF, the criterion table includes: (viii) a determination item indicating a type of situation preventing implementation of the printing on the image forming apparatus; and (ix) the specified criterion according to which the probability of the situation in the determination item is determined to be high, and the determination item includes at least one of forced toner supply, calibration, and warm-up for raising temperature of a fixation device.

2. The electronic device according to claim 1, wherein the control section including the CPU is further configured for executing the AR program so as to:

determine which of black-and-white printing and multicolor printing is a type of printing to be performed based on a designation of printing included in the print data, i) if the type of printing is the black-and-white printing determine what is a content of black-and-white (B&W) printing-time acquisition target information set by an user;
 set, if the content of the B&W printing-time acquisition target information is a black and white machine only, the black-and-white machine-targeted flag and the black toner use flag to ON; and
 set, if the content of the B&W printing-time acquisition target information is the black and white machine and a color machine, the color machine-targeted flag, the black-and-white machine-targeted flag, and the black toner use flag to ON, and ii) if the type of printing is the multicolor printing;
 determine what is the use toner color by subjecting the print data to color conversion;
 determine, if the use toner color is a black only, what is the content of the B&W printing-time acquisition target information set by the user, and perform a successive process described in the case of the type of printing being the black-and-white printing; and
 set the color machine target flag to ON if the use toner color is not a black only, the cyan toner use flag to ON if a cyan is at least one of the use toner colors, the magenta toner use flag to ON if a magenta is at least one of the use toner colors, the yellow toner use flag to ON if a yellow is at least one of the use toner colors, and the black toner use flag to ON if the black is at least one of the use toner colors.

3. An image forming system comprising:
a mobile device that comprises a display device as a liquid crystal display (LCD); and
an image forming apparatus that performs printing on a recording medium based on print data;
the mobile device further comprising:
 a non-volatile storage device as a hard disk drive (HDD) that stores an augmented reality (AR) program;
 an image pickup device; and
 a control section including a central processing unit (CPU) configured for executing the AR program stored in the non-volatile storage device as the HDD so as to:
  determine, from the print data of the image forming apparatus, one or more use toner colors which are colors of toners for use during printing based on the print data; and
  determine a degree of recommendation of the image forming apparatus according to a probability of a situation preventing implementation of the printing on the image forming apparatus, wherein the display device as the LCD displays a synthetic image in which the degree of recommendation determined is associated with an image of the image forming apparatus shot by the image pickup device;

the control section including the CPU is further configured for executing the AR program stored in the non-volatile storage device as the HDD so as to acquire for acquiring apparatus information about the image forming apparatus from a server via a network and determine the probability according to whether or not the information, included in the apparatus information, on the toners of the use toner colors determined meets a specified criterion, the non-volatile storage device as the HDD stores: (i) a criterion table indicating the criterion for the degree of recommendation; (ii) a color machine-targeted flag; (iii) a black-and-white machine-targeted flag; (iv) a cyan toner use flag indicating whether or not to use cyan toner; (v) a magenta toner use flag indicating whether or not to use magenta toner; (vi) a yellow toner use flag indicating whether or not to use yellow toner; and (vii) a black toner use flag indicating whether or not to use black toner;

the control section including the CPU is configured for executing the AR program stored in the non-volatile storage device as the HDD so as to:

request the server, if the black-and-white machine-targeted flag is not ON, to send the apparatus information about a color machine only;
request the server, if the color machine-targeted flag is not ON, to send the apparatus information about a black-and-white machine only; and
determine the degree of recommendation based on the criterion table and the apparatus information excluding specified apparatus information with the cyan toner use flag being OFF or the magenta toner use flag being OFF or the yellow toner use flag being OFF or the black toner use flag being OFF, the criterion table includes: (viii) a determination item indicating a type of situation preventing implementation of the printing on the image forming apparatus; and (ix) the specified criterion according to which the probability of the situation in the determination item is determined to be high, and the determination item includes at least one of forced toner supply, calibration, and warm-up for raising temperature of a fixation device.

* * * * *